US008671228B1

(12) United States Patent
Lok et al.

(10) Patent No.: US 8,671,228 B1
(45) Date of Patent: Mar. 11, 2014

(54) SYSTEM AND METHODS FOR MANAGING VIRTUAL ADAPTER INSTANCES

(75) Inventors: Ying P. Lok, Ladera Ranch, CA (US); David R. Eaves, Mission Viejo, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 276 days.

(21) Appl. No.: 12/572,810

(22) Filed: Oct. 2, 2009

(51) Int. Cl.
*G06F 3/00* (2006.01)
*G06F 9/00* (2006.01)

(52) U.S. Cl.
USPC ............... 710/19; 710/15; 710/16; 710/17; 710/18; 713/1; 713/2; 713/100

(58) Field of Classification Search
None
See application file for complete search history.

(56) References Cited

U.S. PATENT DOCUMENTS

| | | | |
|---|---|---|---|
| 5,638,517 A * | 6/1997 | Bartek et al. | 709/246 |
| 5,909,593 A * | 6/1999 | Abbondonzio et al. | 710/19 |
| 6,023,736 A * | 2/2000 | Lambeth et al. | 710/10 |
| 6,199,137 B1 * | 3/2001 | Aguilar et al. | 710/305 |
| 6,314,525 B1 * | 11/2001 | Mahalingham et al. | 714/4.12 |
| 6,345,331 B1 * | 2/2002 | Fuente | 710/72 |
| 6,381,656 B1 * | 4/2002 | Shankman | 710/18 |
| 6,405,362 B1 * | 6/2002 | Shih et al. | 717/174 |
| 6,477,611 B1 * | 11/2002 | Chang | 710/313 |
| 6,529,964 B1 * | 3/2003 | Schwendiman | 710/8 |
| 6,850,994 B2 * | 2/2005 | Gabryjelski | 710/19 |
| 6,898,644 B1 * | 5/2005 | Perez | 710/10 |
| 7,130,929 B2 * | 10/2006 | Benhase et al. | 710/10 |
| 7,177,952 B1 * | 2/2007 | Wurch et al. | 709/250 |
| 7,383,555 B2 * | 6/2008 | Billau et al. | 719/327 |
| 7,457,887 B1 * | 11/2008 | Winkler et al. | 710/8 |
| 7,464,209 B2 * | 12/2008 | Armstrong et al. | 710/200 |
| 7,586,842 B2 * | 9/2009 | McGee et al. | 370/218 |
| 7,761,604 B2 * | 7/2010 | Larson et al. | 709/249 |
| 7,783,788 B1 * | 8/2010 | Quinn et al. | 710/8 |
| 7,783,807 B2 * | 8/2010 | Armstrong et al. | 710/200 |
| 7,872,965 B2 * | 1/2011 | Enstone et al. | 370/217 |
| 8,065,454 B1 * | 11/2011 | Sonksen et al. | 710/72 |
| 2004/0003135 A1 * | 1/2004 | Moore | 709/321 |
| 2004/0054828 A1 * | 3/2004 | Finch | 710/104 |
| 2006/0200594 A1 * | 9/2006 | Cobb et al. | 710/18 |
| 2007/0242671 A1 * | 10/2007 | Christenson et al. | 370/392 |
| 2007/0248085 A1 * | 10/2007 | Volpano | 370/389 |
| 2007/0250910 A1 * | 10/2007 | Miller et al. | 726/4 |

* cited by examiner

*Primary Examiner* — Henry Tsai
*Assistant Examiner* — Jing-Yih Shyu
(74) *Attorney, Agent, or Firm* — Klein, O'Neill & Singh, LLP

(57) ABSTRACT

System and method for managing a virtual adapter instance associated with a physical adapter is provided. The method includes configuring a monitoring module for detecting change in configuration of the virtual adapter instance; detecting if the configuration has changed for the virtual adapter instance, at any given time; comparing a changed configuration with a previous configuration of the virtual adapter instance; installing a new virtual adapter instance, if new information is present in the changed configuration; and uninstalling the virtual adapter instance, if information from the previous configuration was removed.

21 Claims, 7 Drawing Sheets

SYSTEM AND METHODS FOR MANAGING VIRTUAL ADAPTER INSTANCES

BACKGROUND

The present invention relates to storage and network communication systems.

RELATED ART

Adapters are commonly used by computing systems for sending and receiving information to other devices, including networked devices and networked storage systems. Typically, a physical adapter port is virtualized so that multiple instances of the physical adapter can be used for input/output operations. Each virtual instance may need a virtual adapter driver.

Typically, the physical adapter is automatically detected by a computing system that has access to a plug-n-play (PNP) functionality. The PNP functionality detects the adapter and installs the associated physical adapter driver. The virtual drivers however have to be manually installed. This approach has various shortcomings. For example, if one stops using the physical adapter or removes the physical adapter, the virtual drivers may still be present and cause unnecessary interference with other operations of the computing system. If the virtual configuration is changed, one has to manually update the associated virtual driver. Continuous efforts are being made to improve usage of computing system resources including adapter use.

SUMMARY

The various embodiments of the present system and methods for inter-driver communication have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide advantages, which include reducing the likelihood of conflicts between two drivers sharing a particular hardware resource.

In one embodiment, a machine-implemented method for managing a virtual adapter instance associated with a physical adapter is provided. The method comprises: configuring a monitoring module for detecting change in configuration of the virtual adapter instance; detecting if the configuration a has changed for the virtual adapter instance, at any given time; comparing a changed configuration with a previous configuration of the virtual adapter instance; installing a new virtual adapter instance, if new information is present in the changed configuration; and uninstalling the virtual adapter instance, if information from the previous configuration was removed.

In another embodiment, machine readable storage medium storing executable instructions, which when executed by a machine, causes the machine to perform a process for managing a virtual adapter instance associated with a physical adapter is provided. The process comprises: configuring a monitoring module for detecting change in configuration of the virtual adapter instance; detecting if the configuration has changed for the virtual adapter instance, at any given time; comparing a changed configuration with a previous configuration of the virtual adapter instance; installing a new virtual adapter instance, if new information is present in the changed configuration; and uninstalling the virtual adapter instance, if information from the previous configuration was removed.

In yet another embodiment a computer program product is provided. The computer program product, comprises: a computer usable storage medium having computer readable instructions embodied therein for managing a virtual adapter instance. The computer readable instructions include instructions for configuring a monitoring module for detecting change in configuration of the virtual adapter instance, instructions for detecting if the configuration has changed for the virtual adapter instance, at any given time; instructions for comparing a changed configuration with a previous configuration of the virtual adapter instance; instructions for installing a new virtual adapter instance, if new information is present in the changed configuration; and instructions for uninstalling the virtual adapter instance, if information from the previous configuration was removed.

This brief summary has been provided so that the nature of the disclosure may be understood quickly. A more complete understanding of the disclosure can be obtained by reference to the following detailed description of the preferred embodiments thereof concerning the attached drawings

BRIEF DESCRIPTION OF THE DRAWINGS

The various embodiments of the present system and methods for inter-driver communication now will be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts.

DETAILED DESCRIPTION

Figure 1A:
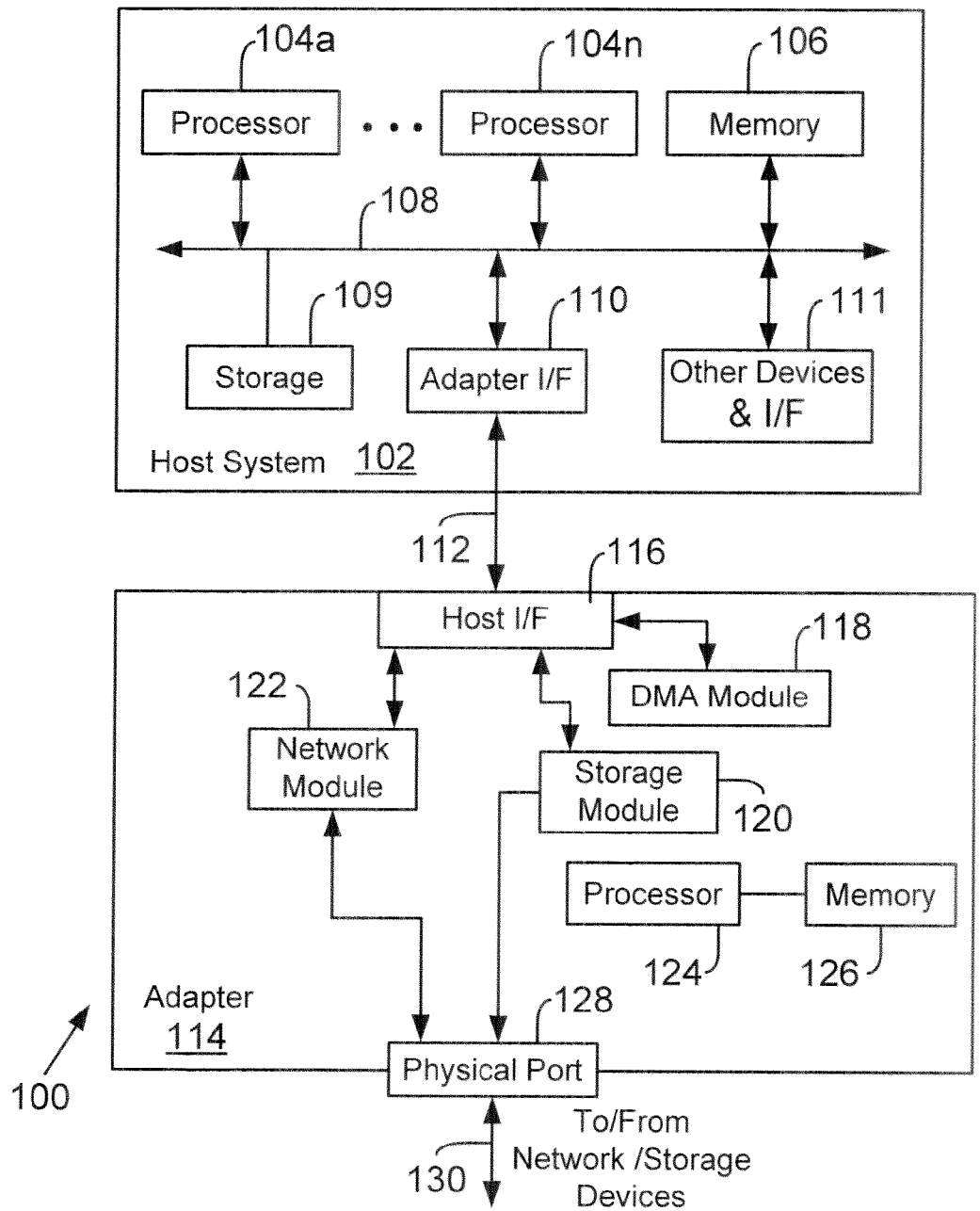
FIG. 1A is a block diagram of the internal functional architecture of a typical host system.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of software implementation, the terms "logic," "module," "component." "system," and "functionality" represent program code that performs specified tasks when executed on a processing device of devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of non-transitory storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as au article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a compute process.

FIG. 1A is a high-level block diagram showing an example of the architecture of a processing system 100, at a high level, in which the processes described herein, can be implemented. Note that certain standard and well-known components, which are not germane to the present invention, are not shown in FIG. 1A.

The processing system 100 includes one or more processor 104 (shown as 104a-104n) and memory 106, coupled to a bus system 108. The bus system 108 is an abstraction that represents any one or more separate physical buses and/or point-to-point connections, connected by appropriate bridges, adapters and/or controllers. The bus system 108, therefore, may include, for example, a system bus, a Peripheral Component Interconnect (PCI) bus, a HyperTransport or industry standard architecture (ISA) bus, a SCSI bus, a universal serial bus (USB), or an Institute of Electrical and Electronics Engineers (IEEE) standard 1394 bus (sometimes referred to as "Firewire").

Processor 104 is the central processing unit (CPUs) of the processing system 100 and, thus, controls its overall operation. In certain embodiments, the processor 104 accomplishes this by executing programmable instructions stored in memory 106. A processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of stick devices.

Memory 106 represents any form of random access memory (RAM), read-only memory (ROM), flash memory, or the like, or a combination of such devices. Memory 106 includes the main memory of the processing system 100. ROM stores invariant instruction sequences, such as start-up instruction sequences or basic input/output operating system (BIOS) sequences for operation of a keyboard (not shown).

Also connected to processor 104 through the bus system 108 are one or more internal mass storage devices 109, an adapter interface 110 and other devices and interface 111. The other devices and interface 111 may include a display device interface, a keyboard interface, and a pointing device interface.

Internal mass storage devices 109 (also referred to as storage 109) may be, or may include any conventional medium for storing data in a non-volatile manner, such as one or more magnetic or optical based disks, flash memory devices. CD-ROMs and others. Storage 109 stores operating system program files, application program files, and other instructions. Some of these files are stored on storage 109 using an installation program. For example, processor 104 may execute computer-executable process steps of an installation program so that the processor 104 can properly execute the application program.

Adapter 114 may include a host interface 116, network module 122, storage module 120, adapter processor 124, memory 126, a direct memory access (DMA) module 118 and at least one physical port 128. The host interface 116 is configured to interface with the host system 102, via interconnect 112. As an example, interconnect 112 may be a PCI, PCI-X, PCI-Express or any other type of interconnect.

Memory 126 may be used to store programmable instructions, for example, firmware. The adapter processor 124 executes firmware stored in the memory 126 to control overall functionality of adapter 114.

DMA module 118 manages requests for link 112. The requests may come from network module 112, storage module 120 or any other components for sending or receiving information.

Port 128 may send information to and receive information from other devices via link 130. Port 128 includes logic and circuitry to handle network information. The nature and structure of the logic will depend on the protocol/standard that is used for handling the information. For example, if Fibre Channel, Ethernet, or other protocols are used, then port 128 includes the logic and circuitry to handle protocol specific communication. The adaptive embodiments disclosed herein are not limited to any particular protocol or standard.

In one embodiment, adapter 114 may be configured to handle both network and storage communication using network module 122 and the storage module 120 that are coupled to port 128. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein is based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a SAN. This functionality would allow Fibre Channel to leverage 10 Gigabit Ethernet networks while preserving in the Fibre Channel protocol.

In an exemplary implementation, adapter 114 may be similar to a converged network adapter available from Qlogic Corporation.

Adapter 114 may be virtualized and shared among different processors, components and systems. The term "virtual" as used herein means a logical image or instance of the physical adapter. More than one virtual instance may be used so that different resources are able to share one physical adapter. Each virtual instance may operate as an independent entity.

Figure 1B:
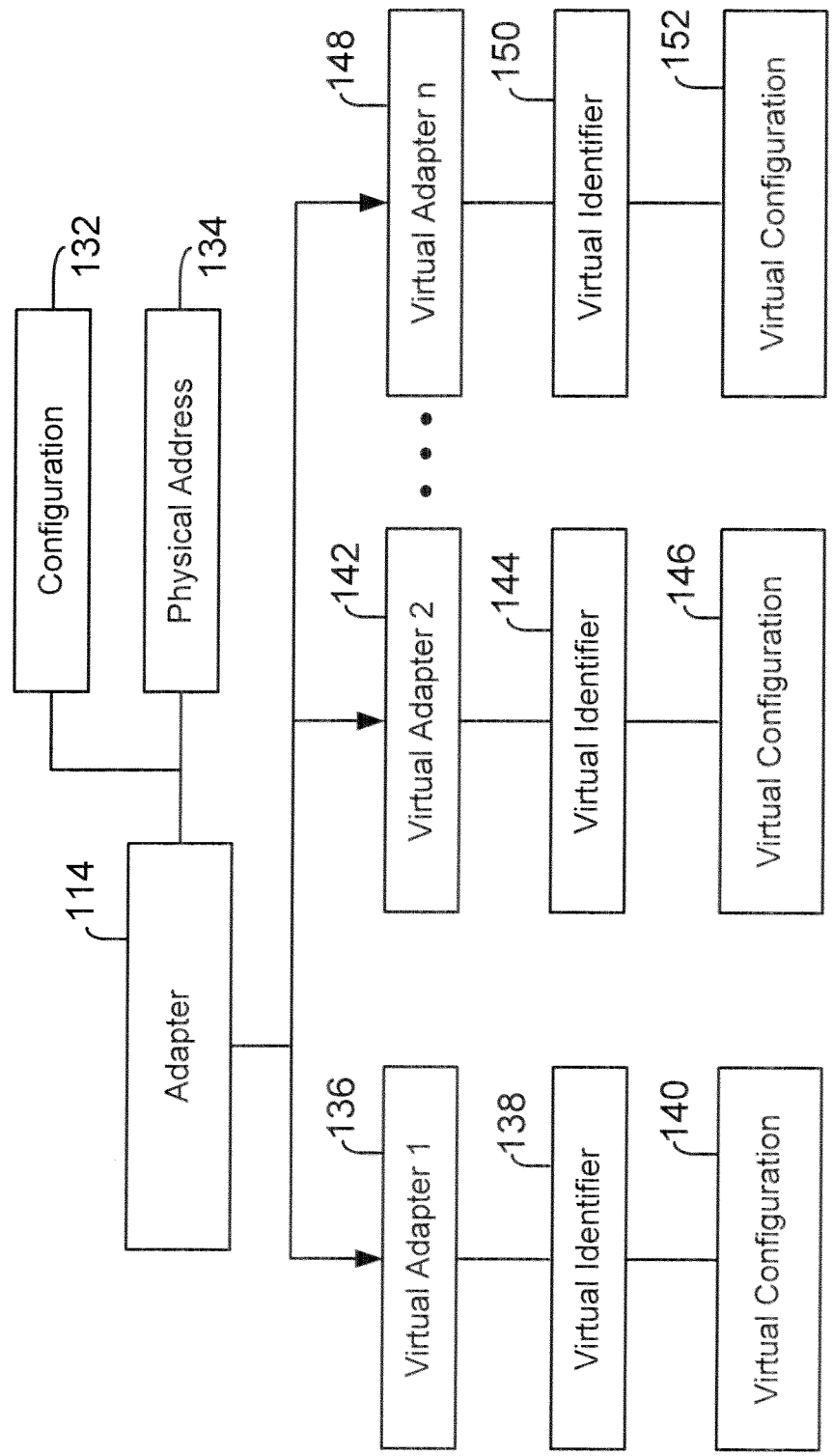
FIG. 1B shows an example of virtual adapter configuration that is used by the various embodiments disclosed herein.

FIG. 1B shows an example of virtualizing adapter 114. The virtualizing adapter 114 includes a configuration 132 and a physical address 134. A first virtual instance for adapter 114 is shown as virtual adapter 1 136. Virtual adapter 1 136 has a virtual identifier 138 and virtual configuration 140. The virtual identifier in this example may be NPIV, an N_Port virtual identification scheme provided by the Fibre Channel standards. In this scheme, port 128 has a unique worldwide port number (WWPN) that is provided by an adapter provider, for example, QLogic Corp. Virtual identifiers (NPIV IDs) may be used to provide unique virtual identifiers for port 128. This allows one to virtualize physical adapter 114 as a virtual adapter 1 136. Virtual adapter 1 136 operates as an independent entity that may be used by a processor, an independent host system or any other component/module.

Similar to virtual adapter 136, various other virtual adapters (142, 148) using different virtual identifiers (144, 150) having different virtual configurations (146, 152) may be used by different components, including different host systems.

Figure 1C:
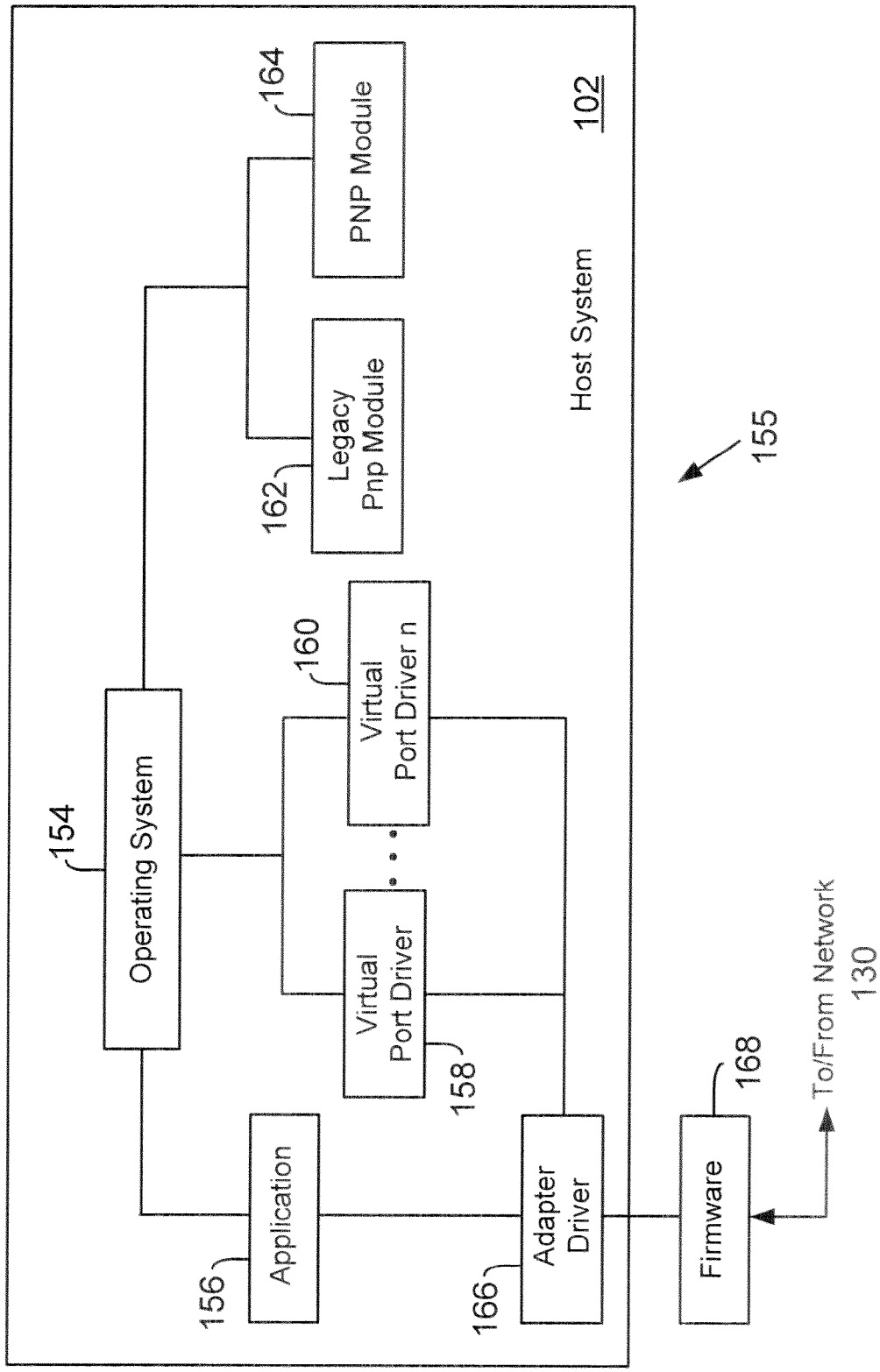
FIG. 1C shows an example of a system using a legacy plug-n-play module.

FIG. 1C shows a top-level block diagram of a system 155 used for net communication. System 155 includes an operating system 154 that is executed by processor 104 out of memory 106, according to one embodiment. Processor 104 may execute application module 156 to generate input/output requests. In one embodiment, application module 56 may issue I/O requests for reading and writing information stored at other devices, for example, storage devices. Application 156 may send an I/O request to adapter driver 166 that in interfaces with adapter firmware 168, executed by adapter processor 124. Based on the request, information is either received or sent to host system 102.

When adapter 114 is virtualized, processor 104 executes virtual port drivers 158, 160. Virtual drivers 158 and 160 are mapped to physical adapter driver 166.

In conventional systems, a plug-n-play (PNP) module 164 is used for recognizing adapter 114. PNP in this context means that when adapter 114 is plugged into a slot (for example, a PCI, PCI-X, PCI-Express slot), the PNP module 164 immediately recognizes the hardware and loads adapter driver 166, if one is not available.

The legacy PNP module 162 is used for installing virtual port drivers 158, 160. Under the legacy PNP module 162, one has to manually install a virtual driver. One reason for doing that is because a virtual instance of the adapter may be configured by the user without inserting/re-inserting the physical adapter.

The use of legacy PNP module 162 has shortcomings. For example, whenever adapter driver 166 is removed, virtual drivers 158 and 160 may still linger on and may even attempt to restart after a reboot operation. To solve this problem, one will have to manually remove the virtual drivers after the physical adapter or driver is removed/modified. Another problem the conventional systems is that if there is a change in configuration of a virtual or physical driver, one has to manually update all the virtual drivers.

The various embodiments disclosed herein alleviate the problems associated with virtual adapters/drivers. A virtual port driver manager module is provided that automates virtual adapter driver installation, monitors driver/adapter configurations and updates the virtual drivers.

Figure 1D:
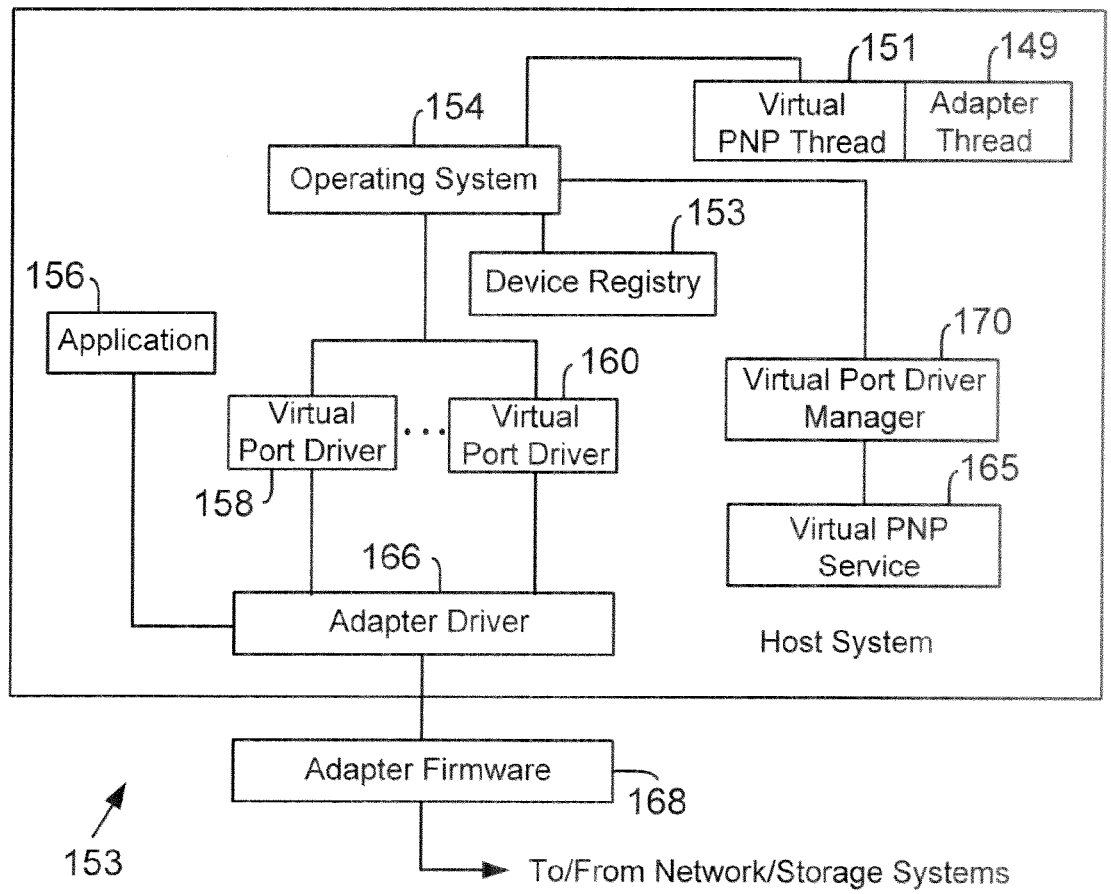
FIG. 1D shows an architecture of a system, according to one embodiment.

FIG. 1D shows an example of a virtual port driver manager 170 (may be referred to as manager 170) that handles the various functions associated with virtual adapters and drivers, as described below. Manager 170 is installed when adapter 114 is being installed and configured. During adapter 114 configuration, a virtual PNP service 165 is also installed. The virtual PNP service 165 is used to register and create a PNP thread 151 (may also be referred to as a virtual PNP thread) with operating system 154. Virtual PNP thread 151 monitors virtual adapters and virtual adapter configurations.

A physical adapter thread 149 (shown as adapter thread 149) is also created and registered with operating system 154. Adapter thread 149 is used to monitor changes in adapter 114 configuration, including when adapter 114 is removed.

Figure 1E:
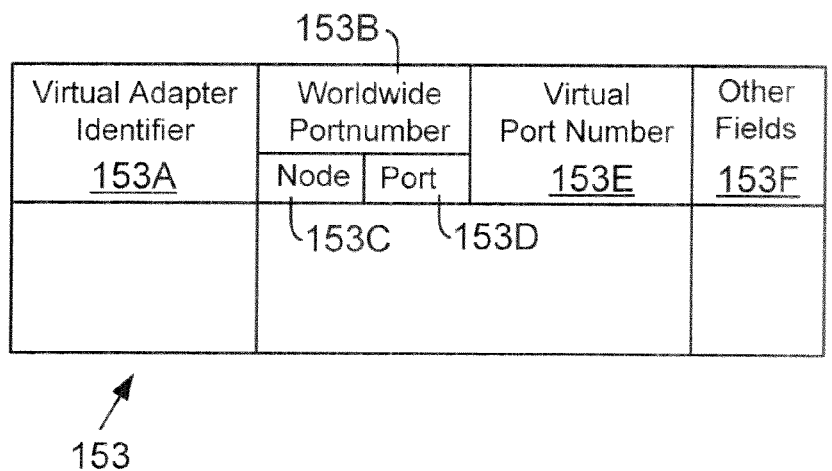
FIG. 1E shows an example of a device registry, used according to one embodiment.

Device registry 153 is maintained by operating system 154 to store information regarding adapter 114. This information may be received from a management application that is used to manage a storage area network (not shown), FIG. 1E shows the type of information that may be stored with respect to adapter 114. For example, registry 153 may include a virtual adapter identifier 153A. This identifier identities a virtual adapter instance (for example, 136, FIG. 1B). In one embodiment, NPIV may be used to identify the virtual adapter instance.

Device registry 153 may also include worldwide port names (WWPNs) 153B having two sub-components 153C and 153D, 153C may be used to identify the adapter 114 as a network node and 153D may be used to identify a physical port of adapter 114, for example, port 128 (FIG. 1A). The WWPNs are typically provided by the adapter 114 provider. For example, QLogic Corporation, a supplier of adapter 114 may provide the WWPNs via a special utility that will generate the WWPNs for the NPIV port for use to attach to the physical adapter port identified by the corresponding WWPN.

Registry 153 also stores the virtual port numbers 153E associated with a physical port. In one embodiment. NPIV may be used to provide a virtual identifier 153E to a physical port. Registry 153 may include other fields 153F that may not be germane to the inventive embodiments disclosed herein.

Referring back to FIG. 1D, Manager 170 manages installation and removal of virtual drivers 158, 160 as virtual adapter configurations are created, modified, updated or removed without having to use the legacy PNP modules 162 (FIG. 1C). One does not need a legacy PNP module 1162 because virtual port driver manager 170 automates handling of virtual adapters/drivers, as described below.

Manager 170 interfacing with operating system 154 installs a virtual adapter instance when a user creates a new virtual adapter configuration. When a configuration is removed, manager 170 removes the configuration and the associated virtual adapter drivers. When a virtual adapter is modified, manager 170 may remove the virtual instance and reinstall a modified version. Manager 170 installs all associated virtual adapters when the physical adapter is installed and initialized. The virtual adapters are removed when the physical adapter is uninstalled.

In one embodiment, manager 170 includes programmable instructions that are executed by processor 104 for performing the various functions described above. The instructions may be executed out a memory (for example, 106). The functionality of manager 170 is now described below with respect to the process flow diagrams of FIGS. 2-4.

Figure 2:
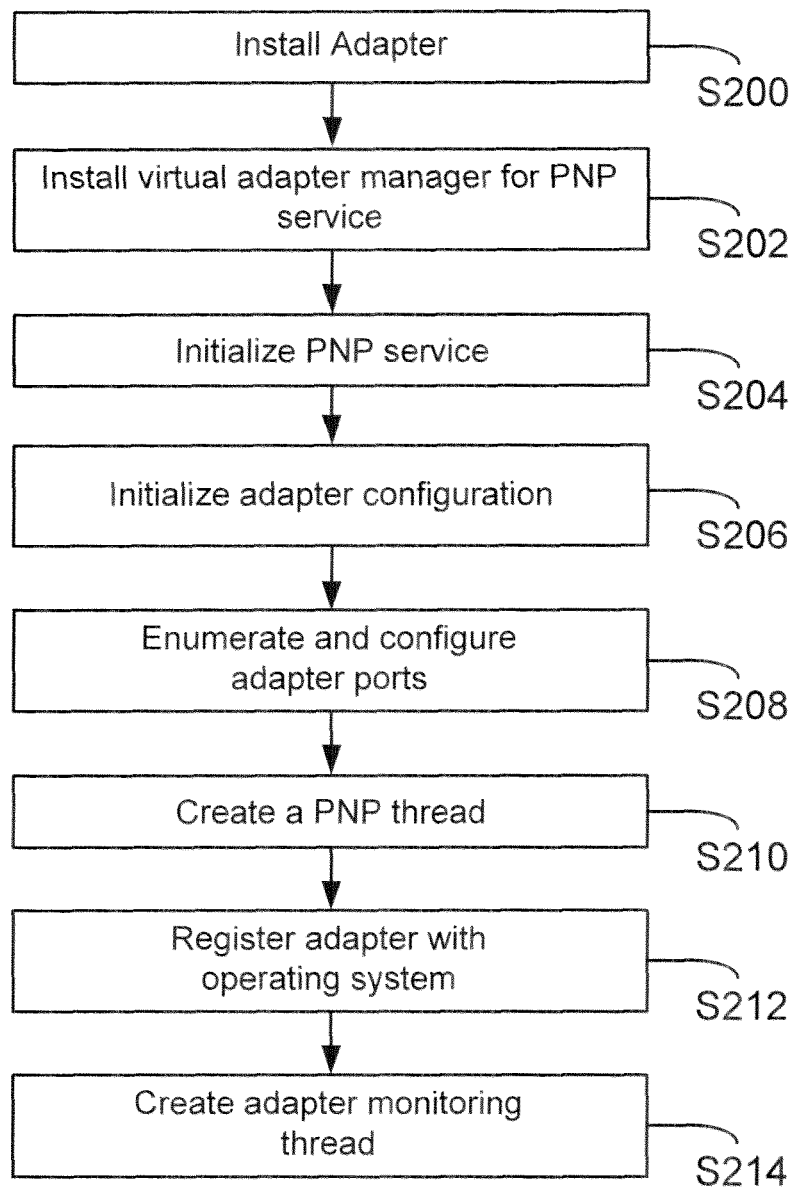
FIGS. 2-4 show various process flow diagrams, according to one embodiment.

FIG. 2 shows a top-level process flow diagram for installing and configuring adapter 114. Adapter 114 is installed in block S200. In one embodiment, adapter 114 is installed in a PCI-Express slot (not shown). The adaptive embodiments however are not limited to any particular type of slot.

In block S202, manager 170 is also installed with adapter driver 166 FIG. 1D). The virtual PNP service 165 is initialized in block S204. The PNP service allows one to configure adapter 114, which is initialized in block S206.

During adapter configuration, all adapter ports (for example, 128, FIG. 1A) are enumerated and configured in block S208. In block S210, virtual PNP thread 151 is created and registered with operating system 154. The virtual PNP thread 151 is used to monitor all virtual adapter instances and configurations.

In block S212, adapter 114 is registered with operating system 154. Thereafter, in block S214, an adapter monitoring thread 149 is created.

The term "thread" as used herein means executable instructions that are programmed for performing a particular task. For example, the PNP thread is used to create, monitor and remove the virtual adapter instances and configurations, while the adapter thread monitors the physical adapter configuration and changes associated therewith, meaning each associated virtual configuration.

Figure 3:
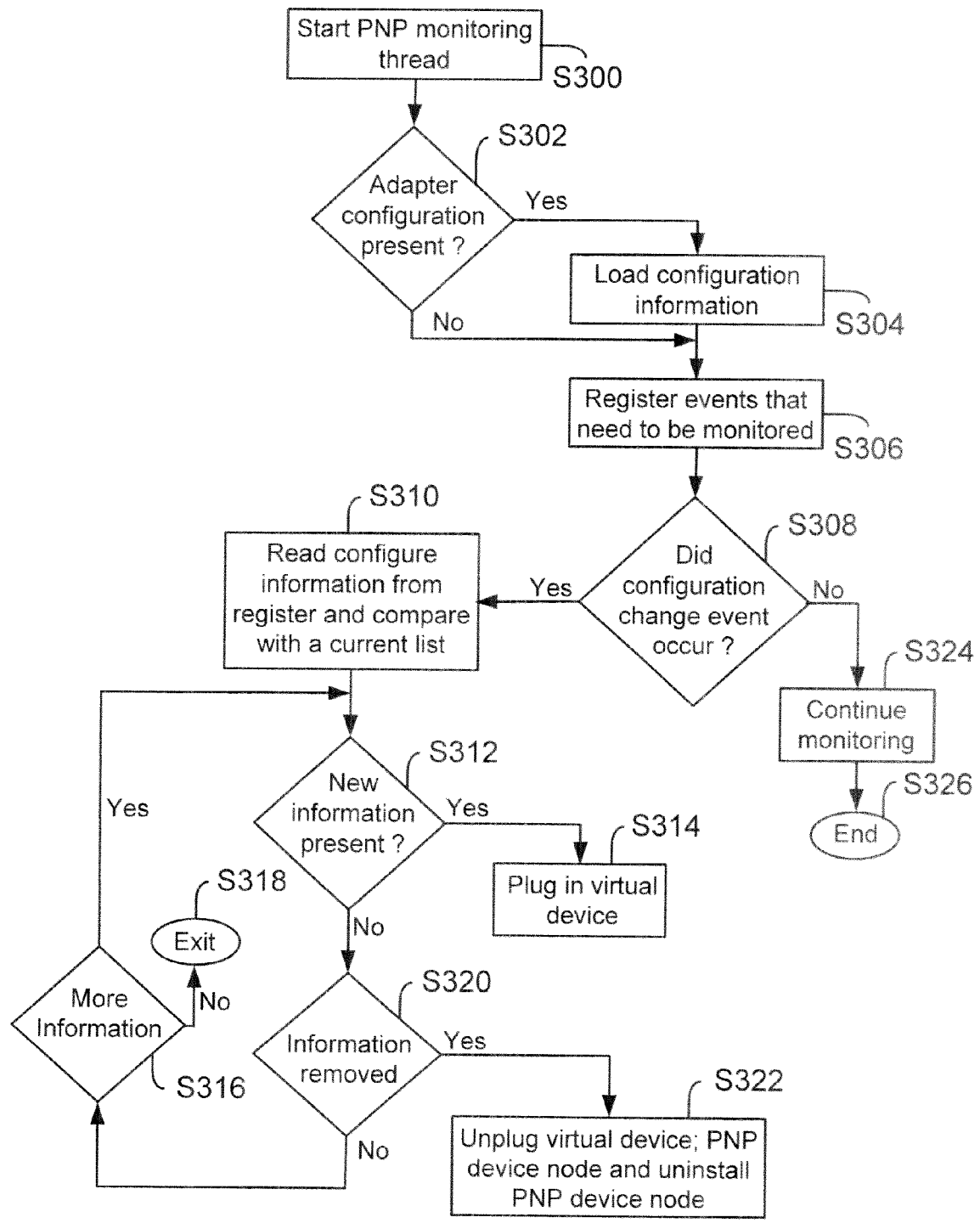

FIG. 3 is a process flow diagram for executing the virtual PNP thread 151, according to one embodiment. The process begins in block S300 and in block S302, manager 170 determines if adapter configuration is present. If the configuration information is present, then it is loaded in block S304. In one embodiment, processor 104 loads the configuration information from register 153 to memory 106. Thereafter, manager 170 registers the events such as changes in configuration such as addition or removal of physical adapters as described in the registry or discovered by the operating system that need to be monitored by the virtual PNP thread 151. The events are registered with operating system 154 that has visibility regarding various system 100 components in step S306. One such event may be to monitor change in virtual adapter configuration.

In block 5308, virtual PNP thread 151 determines if a virtual adapter configuration has changed. Virtual PNP thread 151 may receive that information from operating system 154 that maintains virtual adapter configuration information. If the configuration did not change, the monitoring continues in block S324 and the process ends in block S326.

If the configuration changed, then in block S310, virtual PNP thread 151 reads the configuration information from register 153 and compares it with the changed information. In another embodiment, operating system 154 may perform this step.

Based on the comparison, in block S312, the process determines if new configuration information is present. If yes, then a virtual adapter instance is plugged in by manager 170 using virtual PNP service 165 in step S314.

If no new information is present, then the process determines if information was removed in step S320. If information was removed, then in block S322, the associated virtual adapter instance is removed, and the PNP device (i.e. adapter 114) is uninstalled.

If the information was not removed in block S320, then the process determines if there is more information in step S316. If not, then the process exits in block S318, otherwise the process moves back to block S312.

Figure 4:
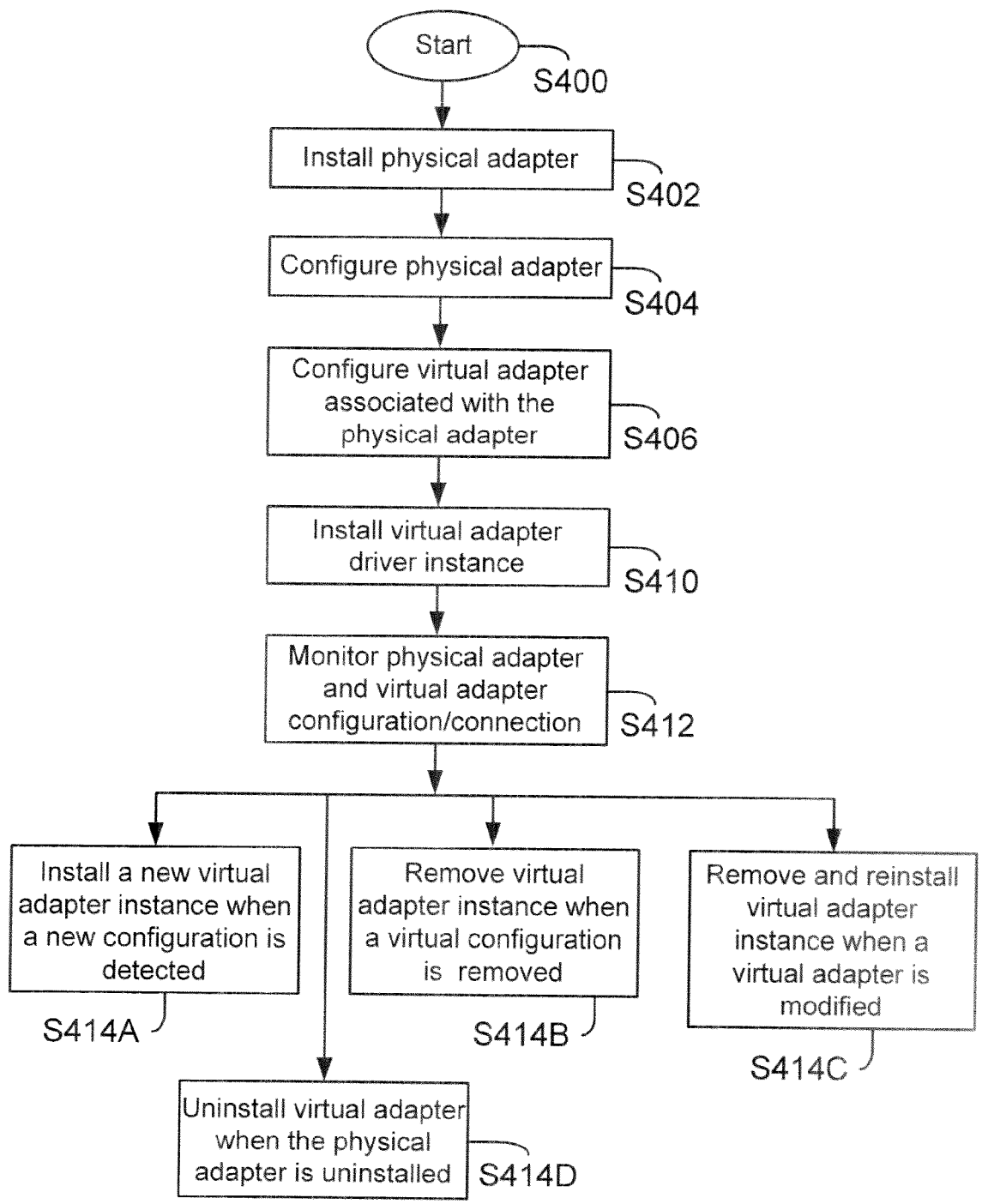

FIG. 4 shows another process flow diagram for using the virtual PNP thread 151 and manager 170, according to one embodiment. The process begins in block S400 when physical adapter 114 is installed. Adapter 114 is typically inserted in an adapter slot (not shown) in host system 102 in step S402. In block S404, a user using a configuration utility or management application configures adapter 114. The user may configure one or more virtual adapters associated with physical adapter 114. NPIV may be used to configure the virtual adapters.

In block S406, a virtual adapter associated with the physical adapter 114 is configured. In block S410, a virtual adapter driver (158, 160) is installed. In one embodiment, manager 170 installs the virtual adapter driver. Thereafter, the adapter 114 is used for sending and receiving information. The configuration and connections for the virtual adapters and the physical adapter are monitored in block S412. The various monitoring steps are shown as blocks S414A-S414D that are described below in detail.

In block S414A, a new virtual adapter instance is installed, if a new configuration is detected.

In block S414B, a virtual adapter instance is removed when a virtual configuration is removed. Manager 170 performs this function.

In block S414C, manager 170 reinstalls a virtual adapter instance, when in existing virtual adapter is modified.

In block S414D, if the physical adapter is removed, then the virtual adapter instances are also removed from the host system. Manager 170 performs this block as well.

The embodiments disclosed herein improve a user's experience in using virtual adapters. One does not have to deal with redundant virtual adapter instances, when they are not being used or needed. Also, adapter drivers and configurations are updated automatically based on a monitoring thread.

Thus, a method and apparatus for handling adapter virtualization have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine-implemented method for managing a virtual adapter instance associated with a physical adapter, comprising:

installing a virtual port driver manager, the virtual port driver manager being configured to manage installation and removal of virtual drivers as virtual adapter configurations are created, modified, updated or removed without a need to use legacy plug-n-play (PNP) modules;

configuring a PNP thread for detecting a change in configuration of the virtual adapter instance, wherein the PNP thread monitors virtual adapters and virtual adapter configurations;

the PNP thread detecting if the configuration has changed for the virtual adapter instance, at any given time;

the PNP thread comparing a changed configuration with a previous configuration of the virtual adapter instance;

the virtual port driver manager installing a new virtual adapter instance, if new information is present in the changed configuration;

the virtual port driver manager uninstalling the virtual adapter instance, if information from the previous configuration was removed; and the virtual port driver manager reinstalling a virtual adapter instance of an existing virtual adapter when the existing virtual adapter is modified.

2. The method of claim 1, wherein a processor executing programmable instructions configures the (PNP) thread for detecting change in configuration.

3. The method of claim 1, wherein a plurality of virtual adapter instances associated with the physical adapter are used by one or more computing systems to send and receive information via the physical adapter.

4. The method of claim 3, wherein the adapter sends and receives network information according to a network protocol.

5. The method of claim 3, wherein the adapter sends and receives storage information according to a storage protocol.

6. The method of claim 3, wherein the adapter is configured to handle Fibre Channel over Ethernet (FCOE) traffic.

7. The method of claim 1, wherein detecting if the configuration has changed for the virtual adapter instance comprises receiving configuration information regarding a configuration change from an operating system that maintains the configuration information.

8. A non-transitory machine readable storage medium storing executable instructions, which when executed by a machine, causes the machine to perform a process for managing a virtual adapter instance associated with a physical adapter, the process comprising:

installing a virtual port driver manager, the virtual port driver manager being configured to manage installation and removal of virtual drivers as virtual adapter configurations are created, modified, updated or removed without a need to use legacy plug-n-play (PNP) modules;

configuring a PNP thread for detecting a change in configuration of the virtual adapter instance, wherein the PNP thread monitors virtual adapters and virtual adapter configurations;

the PNP thread detecting if the configuration has changed for the virtual adapter instance, at any given time;

the PNP thread comparing a changed configuration with a previous configuration of the virtual adapter instance;

the virtual port driver manager installing a new virtual adapter instance, if new information is present in the changed configuration;

the virtual port driver manager uninstalling the virtual adapter instance, if information from the previous configuration was removed; and the virtual port driver manager reinstalling a virtual adapter instance of an existing virtual adapter when the existing virtual adapter is modified.

9. The non-transitory machine readable storage medium of claim 8, wherein a processor executing programmable instructions configures the (PNP) thread for detecting change in configuration.

10. The non-transitory machine readable storage medium of claim 8, wherein a plurality of virtual adapter instances associated with the physical adapter are used by one or more computing systems to send and receive information via the physical adapter.

11. The non-transitory machine readable storage medium of claim 10, wherein the adapter sends and receives network information according to a network protocol.

12. The non-transitory machine readable storage medium of claim 11, wherein the adapter sends and receives storage information according to a storage protocol.

13. The non-transitory machine readable storage medium of claim 11, wherein the adapter is configured to handle Fibre Channel over Ethernet (FCOE) traffic.

14. The non-transitory machine readable storage medium of claim 8, wherein detecting if the configuration has changed for the virtual adapter instance comprises receiving configuration information regarding a configuration change from an operating system that maintains the configuration information.

15. A computer program product, comprising:

a non-transitory computer-readable storage medium having computer readable instructions embodied therein for managing a virtual adapter instance, the computer readable instructions comprising:

instructions for installing a virtual port driver manager, the virtual port driver manager being configured to manage installation and removal of virtual drivers as virtual adapter configurations are created, modified, updated or removed without a need to use legacy plug-n-play (PNP) modules;

instructions for configuring a PNP thread for detecting a change in configuration of the virtual adapter instance, wherein the PNP thread monitors virtual adapters and virtual adapter configurations;

instructions for the PNP thread detecting if the configuration has changed for the virtual adapter instance, at any given time;

instructions for the PNP thread comparing a changed configuration with a previous configuration of the virtual adapter instance;

instructions for the virtual port driver manager installing a new virtual adapter instance, if new information is present in the changed configuration; and instructions for the virtual port driver manager uninstalling the virtual adapter instance, if information from the previous configuration was removed; and instructions for the virtual port driver manager reinstalling a virtual adapter instance of an existing virtual adapter when the existing virtual adapter is modified.

16. The computer program product of claim 15, wherein a processor executing programmable instructions configures the PNP thread for detecting change in configuration.

17. The computer program product of claim 15, wherein a plurality of virtual adapter instances associated with the physical adapter are used by one or more computing systems to send and receive information via the physical adapter.

18. The computer program product of claim 17, wherein the adapter sends and receives network information according to a network protocol.

19. The computer program product of claim 17, wherein the adapter sends and receives storage information according to a storage protocol.

20. The computer program product of claim 17, wherein the adapter is configured to handle Fibre Channel over Ethernet (FCOE) traffic.

21. The computer program product of claim 15, wherein detecting if the configuration has changed for the virtual adapter instance comprises receiving configuration information regarding a configuration change from an operating system that maintains the configuration information.

* * * * *

UNITED STATES PATENT AND TRADEMARK OFFICE
CERTIFICATE OF CORRECTION

PATENT NO. : 8,671,228 B1  
APPLICATION NO. : 12/572810  
DATED : March 11, 2014  
INVENTOR(S) : Ying P. Lok et al.

Page 1 of 1

It is certified that error appears in the above-identified patent and that said Letters Patent is hereby corrected as shown below:

In the Specification

In column 2, line 63, delete ""component."" and insert -- "component," --, therefor.

In column 3, line 20, delete "au" and insert -- an --, therefor.

In column 4, line 7, delete "devices." and insert -- devices, --, therefor.

In column 6, line 49, delete "embodiment." and insert -- embodiment, --, therefor.

Signed and Sealed this  
First Day of July, 2014

Michelle K. Lee  
*Deputy Director of the United States Patent and Trademark Office*